Dec. 14, 1926.

C. H. COLVIN 1,610,930

INSTRUMENT FOR INDICATING ANGULAR MOTION

Filed July 5, 1919  2 Sheets-Sheet 1

INVENTOR
Charles H. Colvin
BY
J. C. Ledbetter
ATTORNEY

Dec. 14, 1926.  
C. H. COLVIN  
1,610,930  
INSTRUMENT FOR INDICATING ANGULAR MOTION  
Filed July 5, 1919     2 Sheets-Sheet 2

INVENTOR  
Charles H. Colvin  
BY  
ATTORNEY

Patented Dec. 14, 1926.

1,610,930

UNITED STATES PATENT OFFICE.

CHARLES H. COLVIN, OF BROOKLYN, NEW YORK.

INSTRUMENT FOR INDICATING ANGULAR MOTION.

Application filed July 5, 1919. Serial No. 308,861.

This invention relates to instruments for indicating angular motion. More particularly it relates to instruments known as turn indicators and pitching indicators for airplanes and dirigible balloons.

An object of the invention is to provide an instrument for use on airplanes or dirigible balloons for indicating to the pilot any deviation from a straight course, and to indicate any turning, pitching or rolling of the craft, in order that the airplane or dirigible balloon may be more safely and accurately navigated by night or through fogs by providing the pilot with a simple instrument which he may watch through the flight and seldom be put to the necessity of observing land marks.

It is also an object and particularly desirable to have more than one means incorporated in a single navigating instrument to vary the sensitivity characteristics thereof, so that one means may be used to alter the characteristics of the instrument to adapt it to the particular type of craft, as for example a slow or fast machine; and another adjusting means to alter the characteristics of the device to adapt it or suit it to particular conditions of flight such as smooth or rough air, or the varying tempermental wishes of the pilot.

The essential features of my invention are the embodiment of a simple air driven gyroscopic element arranged to produce a sensitive indication thru an indicator, and simple means to vary the indicating characteristics of the gyroscope so the sensitivity of the device may be readily adjusted by the pilot to suit particular conditions at the time of flight. The sensitivity adjusting feature is one of much consequence, for without it a manufacturer to be successful with introduction of the invention on the market, would necessarily have to build many different models thereby increasing the cost and handicapping the facility and ease with which the instrument is now being used.

While I am aware that air driven gyroscopes are old, and gyro compasses and artificial horizon instruments are likewise old, and furthermore gyroscopes are used to facilitate the navigation of vessels; yet it is new to produce a small, compact, light weight instrument embodying the aforesaid features, and devoid of all electrical apparatus, to make an instrument specially fitted for aerial use where older gyro instruments could not readily be used.

Figure 1:
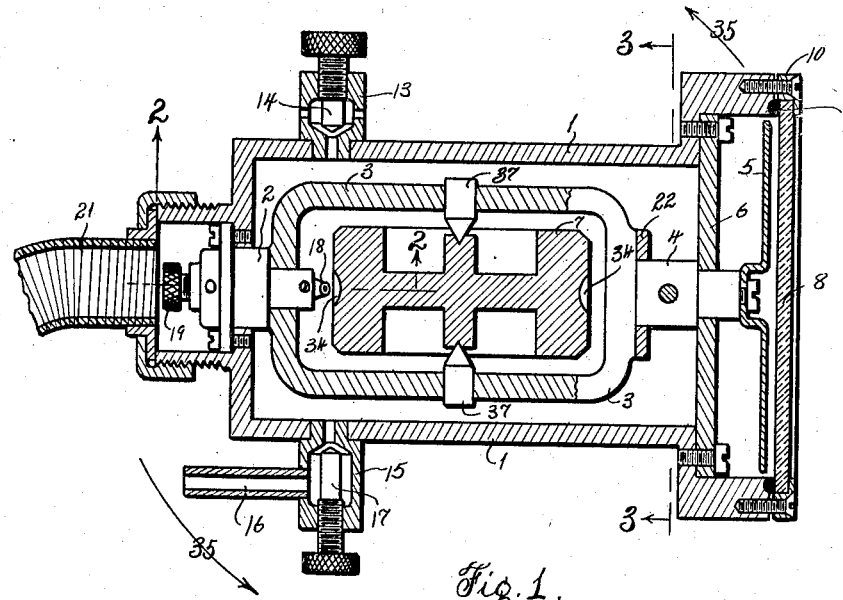
Figure 1 is a view in section, through the center of the instrument at right angles to the axis about which angular motion is to be indicated, or upon the line 1—1 of Figure 3.

Referring now more particularly to the drawings, wherein the same parts throughout the several views are designated by the same reference characters, the numeral 1 points out a substantially air-tight casing in which the instrument parts are contained. A pin or shaft 2 is fixed within one end of the casing 1. Journaled upon the pin 2 is one end of a frame 3, the other end of which is reduced in size to form a shaft 4, which has attached to its extremity an indicator disc 5. A bearing plate or spider frame 6 is secured in the casing 1 and journals the shaft 4. The frame 3 is therefore rotatable about the journals on the pin 2 and the shaft 4. The frame 3 has secured within it two pintle shafts 37, on which the wheel 7 is rotatably supported. This wheel or rotor is notched on the periphery as shown at 34.

The face of the instrument is sealed with a glass plate 8 held against the rubber gasket 9 by the ring 10. The plate 8 is rendered opaque by painting or other more appropriate means, except for two view openings 11 and 12, through which the indicator is observed.

A valve box 13 is secured in the casing 1, through which air may be admitted to the instrument. The valve 14 may be adjusted relatively to the box 13 to regulate or stop the flow of air. Another valve box 15 is secured in the casing 1, through which air may be drawn off from the instrument through the tube 16. The valve 17 may be adjusted relatively to the air passage thru the box 15 to regulate or stop the flow of air; and it is an advantage to use this valve during flight to adjust the sensitivity of the instrument to suit the flight conditions or climatic conditions existing at the time.

Figures 2, 3:
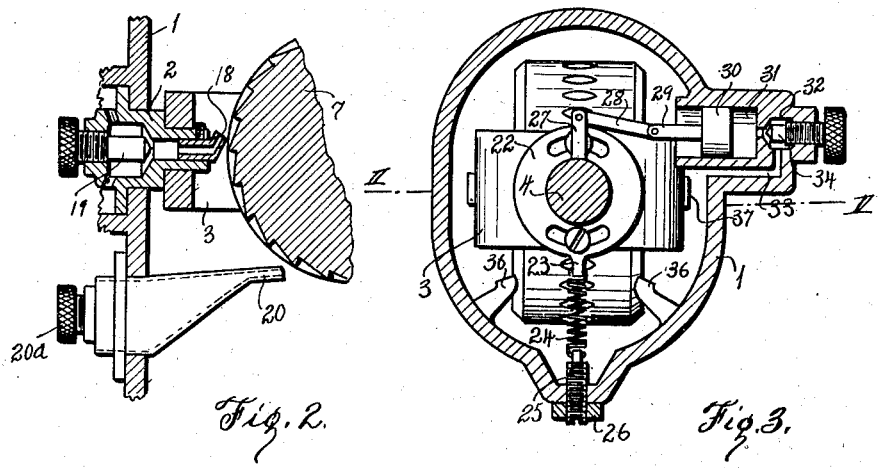
Figure 2 is a fragmentary view, partly in section, through that part of Figure 1 indicated by the line 2—2.
Figure 3 is a sectional view on the line 3—3 of Figure 1.

Referring particularly to Figure 2, the pin 2 is bored out so that, in addition to supporting the frame 3 as previously described, it contains a passage for admitting air to the instrument through the jet 18. This jet 18 is secured in the pin 2 by a set-screw or other means so that it may be adjusted relatively to the wheel 7. The valve 19 is threaded within the hollow pin 2 so that it may be moved relatively to the pin to regulate or stop the air flow through the jet 18.

An additional jet 20 may be employed in some types of instruments and is mounted in the case so that its inner end lies adjacent to the notches of the wheel for directing a stream of air against the wheel in opposition to the turning moment so that the speed of the wheel may be regulated. An intake regulating valve 20ª is employed to control the amount of air directed through the jet 20.

Referring again to Figure 1, 21 designates a flexible tube or conduit through which air must pass to reach the passage in the hollow pin 2 and the jet 18. This tube may have its other end, which is not shown, distantly located in respect to the instrument casing for the purpose of obtaining a supply of suitable air, for example warm air, for running the gyroscopic wheel.

Referring now particularly to Figure 3, a ring 22 encircles the shaft 4 and is secured to the frame 3 so that it may be adjusted relatively to the frame. This ring 22 has an ear 23 to which is attached one end of a spring 24, and the other end of this spring 24 is secured to a screw 25. By means of a nut 26 or by other more appropriate means, the tension of the spring 24 may be adjusted to vary the centralizing effort of the spring on the gyroscopic element 3—7. This spring tends to hold the frame 3 in a normal position, and stops 36 are provided to limit the angular movement of the frame 3, by preventing further rotation of the frame about its axis when the frame strikes one of said stops. It is particularly practical to use this spring to adjust the instrument so as to adapt it say, to a slow or fast craft, or stable or unstable craft.

A pin 27 is attached to the shaft 4, and has pivotally fitted to its upper end the link 28, the other end of which is pivotally attached to the piston rod 29, carrying a piston 30. This piston is reciprocatively confined in the cylinder 31. In the end of the cylinder 31 is built a valve box 32 connecting to the casing through the passage 33. A valve 34 is movable relatively to the air passage in the box 32 for regulating or stopping the flow of air through the passage 33.

Figure 5:
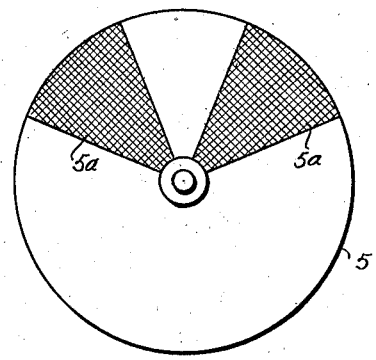
Figure 5 is a view of an indicating element removed from the casing of the instrument.

Referring now to Figure 5, the indicator disc 5 is shown in a preferred form. The color portions or sectors 5ª are of a color contrasting with that of the rest of the indicator disc. A preferred color combination is white or radium luminous material for the sectors and black for the balance of the surface or background of the indicator. In the description to follow this method of marking will be assumed.

Figure 4:
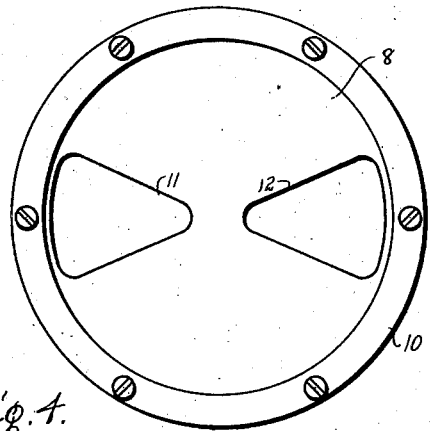
Figure 4 is a view of the face of the instrument, when no angular motion is indicated.

Referring to Figure 4, the face of the instrument is shown, with the indicator disc in neutral or quiescent position. The transparent view openings 11 and 12 therefore expose only the black surface of the indicator 5. The opaque part of the glass plate 8 is preferably of the same color as the background of the indicator disc 5, which has been assumed to be black for the purpose of this description, and therefore the entire surface of the face of the instrument appears to be black.

Figure 6:
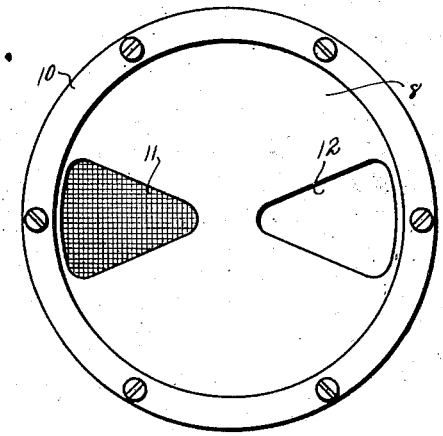
Figure 6 shows the face of the instrument as it appears in indicating a turn.

In Figure 6, the instrument is shown with the indicator disc 5 rotated to give an indication of angular motion. The face of the instrument now appears as a black surface with one white sector indicating a turn, which has caused the gyroscopic element comprising the wheels and frame to work the indicator.

Proceeding now to a description of the functioning of the instrument, assume that the valve 14 and the jet 20 are closed and the valves 17 and 19 are open and that suction has been applied to the tube 16 for a time sufficient to properly evacuate or rarefy the air in the casing. The only place where air may enter the case is through the jet 18, and air passing through this jet impinges on the notches 34 cut in the periphery of the wheel 7, causing the wheel to rotate at high speed.

A wheel rotating at high speed has a valuable characteristic which is employed in this instrument. If a revolving wheel be turned about an axis at right angles to its axis of rotation, it will react by turning about an axis at right angles both to its axis of rotation and to the axis about which it has been turned. This performance of the wheel and movable frame is the result of gyroscopic force developed by the spinning wheel which force causes the gyro element to move about the axis of the journals 2 and 4.

Figure 7:
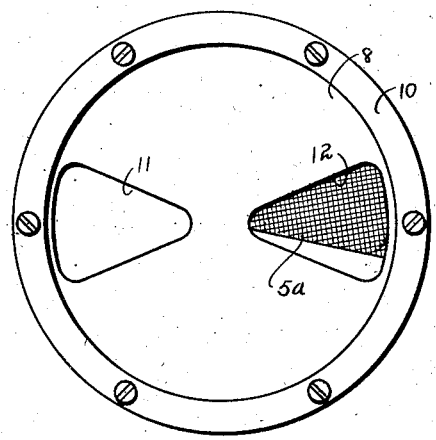
Figure 7 shows a view of the face when the instrument is indicating a turn opposite in direction to that of Figure 6 and at a slower rate of turn.

Now suppose the entire instrument to be rotated to simulate the turning motion of an airplane. This angular motion will be about an axis perpendicular to the plane of the drawing, as indicated by the arrows 35, and this angular motion tends to cause the rotating wheel to move its supporting frame 3 in its journals, thereby moving the indicator disc 5. The angular motion of the frame is restrained by the spring 24 and the stops 36. A turning movement of the casing 1 or of the vehicle on which the instrument is mounted as shown by the arrows 35 is therefore indicated on the face of the instrument as shown in Figure 6. A turn of the vehicle in the opposite direction would conversely be indicated by the appearance of a white sector of the indicator on the opposite side of the face of the instrument as in Figure 7.

In certain uses of an indicator of angular motion it is desirable that the amount of movement of the indicating means shall be in certain relation to the speed of angular motion, and it is also desirable to have that relation easily alterable according to the pleasure of the user of the instrument, for example according to the desire of an aviator navigating a flying machine.

There are two principal factors upon which the relation between the rate of angular motion and the amount of indication depend. These are the rotative speed of the wheel and the strength of the spring 24. Also, there are several factors upon which the speed of the wheel depends. These are the strength of the vacuum applied to the case, the tightness of the case in resisting the leaking in of air, the facility with which air may enter the driving jet 18, the position of this jet 18 in reference to the wheel 7, and the admission of air tending to run the wheel in the opposite direction as through the jet 20. Means of regulating the speed of the wheel by controlling all of these factors are provided, any or all of which may be used in the instrument depending upon the facility of the mechanical construction of the various means. Means for regulating the strength of the spring 24 are shown as the screw 25 and the nut 26. Means of regulating the strength of the vacuum applied to the casing is shown in the throttling valve 17. Means of regulating the tightness of the case is illustrated in the valve 14. Means of controlling the flow of air to the jet 18 is shown in the valve 19. Means of altering the position of the jet in relation to the wheel 7 is illustrated in the set-screw for locking the jet in any position. Means for admitting air tending to run the wheel 7 in the opposite direction is shown in the jet 20 and its regulating means.

In order to facilitate the proper adjustment of the instrument so that in its neutral position the sectors of the indicator 5 will be equally spaced in relation to the openings 11 and 12, means are provided for shifting the position of the spring 24 in relation to the frame 3. This is accomplished by rotating the ring 22 on the frame 3 and clamping it by means of screws in the position desired.

It is in many cases disadvantageous to take air directly into the case from the outside. In an airplane this may be because of dampness or water in the air near the instrument. It is also sometimes desirable to obtain air from a remote source to secure air of a more suitable temperature than that directly outside the case. For this purpose the pipe 21 is used. This may be a flexible conduit or solid tube of such length as may be required to secure a proper supply of air as for example warm air drawn from any suitable place near the motor of the flying machine.

In the foregoing description the wheel has been described as rotated by the impingement of a jet of air due to the rush of air into an evacuated casing. The passage of air through the jet might also be effected by a pressure outside the casing instead of the vacuum heretofore described. It is also within the purpose of this invention to use a wheel operated by other means than air.

In certain places where this instrument may be used it is subjected to severe external vibrations as on an airplane. To prevent these vibrations from producing oscillations of the frame and indicating means a dashpot is employed, comprising the piston 30 and cylinder 31. This prevents undesirable oscillations of the frame and indicating means without hindering the proper movement of these parts in performing their normal functions. The amount of damping is regulated by the adjustment of the valve 34.

In the use of this instrument as a turn indicator for aircraft for maintaining a straight flight path, it is the object of the pilot to so steer his craft that neither indicator mark 5ᴬ will appear in the view openings on the face of the instrument. This instrument, if properly observed, will permit the pilot to steer the machine in a perfectly straight line without sighting from land marks.

Having thus described my invention, what I claim, and desire to secure by Letters Patent, is:

1. An instrument for indicating angular motion comprising, a frame, a wheel journaled in the frame, means for imposing elastic restraint upon the frame, a jet for directing air against the wheel to drive said wheel, a jet for directing air against the wheel tending to rotate said wheel in the opposite direction, means for regulating or stopping the flow of air through one of the jets, and indicating means operated by the frame.

2. An instrument for indicating angular motion comprising, a casing having view openings, a frame pivoted in the casing, a wheel journaled in the frame, elastic means for restraining the movement of the frame;

and an indicating disk connected with the frame and having distinctive marks thereon arranged behind the view openings so that movement of the frame exposes one of the marks through a view opening.

3. An instrument for indicating angular motion, comprising in combination: a casing, a frame pivotally supported in said casing, means for elastic restraint disposed between said casing and said frame, means for damping the movement of said frame in respect to said casing, means for varying the intensity of said damping, a rotatable wheel pivotally supported in said frame on an axis at right angles to the axis about which said frame is supported in said casing, means for driving said wheel, and indicating means operated by the frame.

4. An instrument for indicating angular motion, comprising in combination: a casing, a frame pivotally supported in said casing, means for elastic restraint disposed between said casing and said frame, means for varying the intensity of said elastic restraint, means for damping the movement of said frame in respect to said casing, means for varying the intensity of said damping, a rotatable wheel pivotally supported in said frame on an axis at right angles to the axis about which said frame is supported in said casing, means for driving said wheel, and indicating means operated by the frame.

5. An instrument for indicating angular motion, comprising in combination: a casing, a frame pivotally supported in said casing, means for elastic restraint disposed between said casing and said frame, means operable external to the casing for varying the intensity of said elastic restraint, means for damping the movement of said frame in respect to said casing, means operable external to the casing for varying the intensity of said damping, a rotatable wheel pivotally supported in said frame on an axis at right angles to the axis about which said frame is supported in said casing, means for driving said wheel, and indicating means operated by the frame.

6. An instrument for indicating angular motion comprising, a casing, a gyroscopic element in the casing, a tube connected with the casing for conveying air from a distant point to said casing, an air jet arranged to deliver air from the tube to run the gyroscopic element, a valve to vary the flow of the air to regulate the speed of the gyroscopic element, and indicating means related with the gyroscopic element for showing the precession of the gyroscope due to the turning of the vehicle.

7. An instrument for indicating angular motion, comprising a gyroscopic element adapted to be driven by air force, an indicator connected with and worked by the gyroscopic element, a spring to elastically restrain the indicator, means for varying the tension of the spring to adjust the sensitivity of the indication shown by the indicator for the purpose of adapting the instrument to various kinds of craft such as slow or fast aircraft, and a valve for controlling the air force driving the gyroscopic element and thereby adjusting the sensitivity of the instrument during flight so as to adapt the instrument to the then existing flight conditions.

8. An instrument for indicating angular motion, comprising in combination: a casing, a frame pivotally supported in said casing, means for elastic restraint disposed between said frame and said casing, pneumatic means for damping the movement of said frame in respect to said casing, means for varying the intensity of said damping, a rotatable wheel pivotally supported in said frame on an axis at right angles to the axis about which said frame is supported in said casing, means for driving said wheel, and indicating means, operated by the frame.

9. An instrument for indicating angular motion, comprising in combination: a casing, a frame pivotally supported in said casing, a wheel rotatably supported in said frame on an axis at right angles to the axis about which said frame is supported in said casing, means for driving said wheel, means for damping the movement of said frame in respect to said casing, comprising a cylinder attached to said casing, a piston disposed in said cylinder, means connecting said piston with said frame to move said piston in respect to said cylinder when said frame moves in respect to said casing, a passage connecting the interior of said cylinder to the interior of said casing, a valve disposed to vary the effective size of said passage, and indicating means operated by the frame.

10. An instrument for indicating angular motion, comprising in combination: a gyroscope adapted to be air driven, rotatably supported in a frame; said frame pivotally supported in a casing, the pivotal axis being at right angles to the axis of rotation of said gyroscope; means for rotating the gyroscope comprising air directing means connected with said casing; tubular means for conveying air from a distant source to said air directing means; readily removable means for attaching said tubular means to said casing, and indicating means operated by the gyroscope.

11. An instrument for indicating angular motion, comprising in combination: a casing, a frame pivotally supported in said casing, means for elastic restraint disposed between said casing and said frame, means for varying the intensity of said elastic restraint, means for damping the movement of said frame in respect to said casing, means for varying the intensity of said damping, a rotatable wheel pivotally supported in said frame on an axis at right angles to the axis about which said frame is supported in said casing, means for rotating said wheel, means for varying the speed of rotation of said wheel, and indicating means operable by the movement of said frame in respect to said casing.

12. A turn indicator comprising, a casing, a gyroscope mounted therein, means to drive the gyroscope, an indicator operated by the gyroscope, a damping means contained within the casing and cooperating with the gyroscope, and adjustment means mounted external of the casing cooperating with the damping means to vary the damping effect exerted on the gyroscope.

13. A turn indicator comprising, a casing, a gyroscope mounted therein, pneumatic means to drive the gyroscope, air damping means within the casing and connecting with the gyroscope, and air adjustment means mounted on the outside of the casing to control the circulating of air within the damping means to vary the damping effect exerted on the gyroscope, and indicating means operated by the gyroscope.

14. An instrument for indicating angular motion comprising, a casing, a gyroscopic element in the casing, a tube connected with the casing for conveying air from a distant point to said casing, an air jet arranged to deliver air from the tube to run the gyroscopic element, and indicating means related with the gyroscopic element for showing the precession of the gyroscope due to the turning of the vehicle.

15. A turn indicator for indicating angular motion comprising in combination, a casing, a gyro frame therein pivotally carried, a gyro wheel journaled in the frame, means driving the wheel to produce gyroscopic force capable of precessing the frame, an indicator, a connection made between the frame and indicator, a gyro centralizing spring having one end thereof attached to the gyro frame, and an externally exposed regulating device mounted on the casing to which is attached the other end of the aforesaid centralizing spring and by which the tension of the spring may be regulated by adjustment outside the casing.

16. Gyroscopic apparatus comprising in combination, an air tight casing, a gyroscopic wheel journalled therein, an air tube connected with the casing to feed air thereto from a remote source, and an air jet adapted to deliver air from the tube against the wheel to drive same.

In testimony whereof I affix my signature.

CHARLES H. COLVIN.